E. F. MADDOX.
LEVELER AND PULVERIZER.
APPLICATION FILED NOV. 15, 1915.

1,208,599.

Patented Dec. 12, 1916.

Witnesses

Inventor
E. F. Maddox,
By Victor J. Evans
Attorney

UNITED STATES PATENT OFFICE.

EDWARD FRANKLIN MADDOX, OF NELSON, WISCONSIN.

LEVELER AND PULVERIZER.

1,208,599.  Specification of Letters Patent.  Patented Dec. 12, 1916.

Application filed November 15, 1915. Serial No. 61,629.

*To all whom it may concern:*

Be it known that I, EDWARD F. MADDOX, a citizen of the United States, residing at Nelson, in the county of Buffalo and State of Wisconsin, have invented new and useful Improvements in Levelers and Pulverizers, of which the following is a specification.

This invention is an improved leveler and pulverizer for leveling and pulverizing the soil between the rows of growing crops, especially corn rows, after the corn has grown so large that a cultivator cannot be used, the object of the invention being to provide an improved device of this character which is cheap and simple, is strong and durable and which is very efficient in operation.

The invention consists in the construction, combination and arrangement of devices hereinafter described and claimed.

Figure 1:
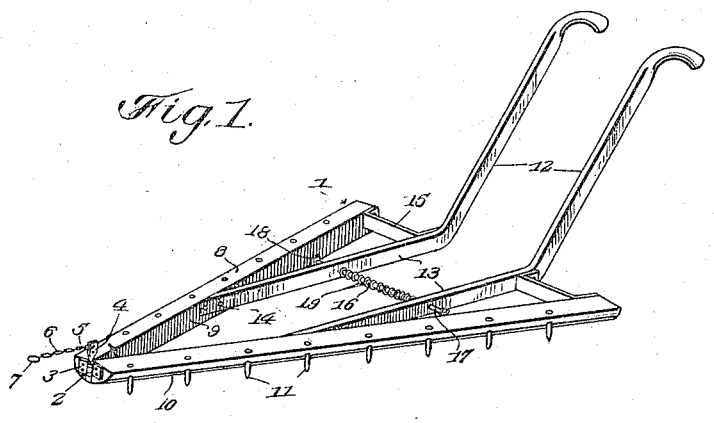
Figure 2:
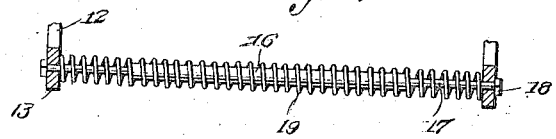
Figure 3:
Figure 4:
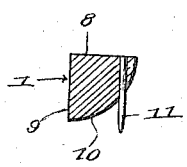

In the accompanying drawings, Figure 1 is a perspective view of a leveler and pulverizer constructed in accordance with my invention. Figs. 2—3 are detail sectional views. Fig. 4 is a detail transverse sectional view.

In the embodiment of my invention I provide a pair of bars 1 which are arranged at an angle to each other, converge at their front ends, and have their front ends connected together by a hinge 2, which comprises a pair of members 3, and a bolt 4 which forms a pintle. The bolt extends above the bars or runners, has its upper portion flattened and is provided with a series of openings any one of which may be engaged by a hook 5 at the rear end of a draft chain 6, said draft chain having a ring 7 at its front end for attachment to a swingletree. Each of the bars 1 is substantially quarter-cylindrical in cross section, having a flat upper side 8, a flat vertical inner side 9 and a rounded outer side 10. The bars are provided with teeth 11 of suitable length, which are arranged a suitable distance apart. The teeth slant slightly to the rear.

A pair of handle bars 12 are arranged between the bars 1 and have forwardly extending arms 13 which are secured, as at 14, to the inner sides of the bars 1 or runners at points a suitable distance from the front ends thereof. Each handle bar 12 is connected to the rear end of one of the bars 1 and held in spaced relation thereto by means of a brace bar 15.

A bolt rod 16 is connected to the arms 13. This bolt rod has reduced end portions 17 which pass through openings in the arms 13 so that said bolt is slidably connected to said arms. Suitable nuts 18 are screwed on the ends of the bolts. The reduced ends 17 are sufficiently long to permit of movement of the handle bars and hence of the runners or bars toward and from each other to some extent. To keep the bars spaced apart to the desired extent we provide a spring 19 which is a coiled spring arranged on the bolt 16 and the ends of which bear against the inner sides of the handle bars 13.

While I have herein shown and described a preferred form of my invention I would have it understood that changes may be made in the form, proportion and construction of the several parts without departing from the spirit of the invention and within the scope of the appended claim.

Having thus described my invention I claim;—

The herein described leveler and pulverizer comprising a pair of forwardly converging bars, each provided with teeth, a hinge pivotally connecting said bars together, at their front ends and including a pintle bolt having adjusting openings in its upper portion and extending above the bars, a draft element attached to one of the openings of said bolt, a pair of handle bars arranged on the inner sides of the first named bars and each having a forwardly extending arm attached to one of said first named bars and also having an outwardly extending brace attached to the rear end of one of the first named bars, a bolt connecting and slidably connected to the arms of the handle bars and a spring on said bolt and bearing against the inner sides of the arms of said handle bars.

In testimony whereof I affix my signature in presence of two witnesses.

EDWARD FRANKLIN MADDOX.

Witnesses:
VIOLET A. GIEBEL,
E. GIEBEL.

Copies of this patent may be obtained for five cents each, by addressing the "Commissioner of Patents, Washington, D. C."